(12) United States Patent
Woolford

(10) Patent No.: US 10,844,819 B2
(45) Date of Patent: Nov. 24, 2020

(54) CONTROL STRATEGY FOR ENGINE OPERATION

(71) Applicant: ORBITAL AUSTRALIA PTY LTD, Balcatta (AU)

(72) Inventor: Richard Albert Woolford, Connolly (AU)

(73) Assignee: ORBITAL AUSTRALIA PTY LTD, Balcatta (AU)

(*) Notice: Subject to any disclaimer, the term of this patent is extended or adjusted under 35 U.S.C. 154(b) by 0 days.

(21) Appl. No.: 16/647,043

(22) PCT Filed: Sep. 14, 2018

(86) PCT No.: PCT/AU2018/051009
§ 371 (c)(1),
(2) Date: Mar. 13, 2020

(87) PCT Pub. No.: WO2019/051559
PCT Pub. Date: Mar. 21, 2019

(65) Prior Publication Data
US 2020/0256301 A1    Aug. 13, 2020

(30) Foreign Application Priority Data
Sep. 14, 2017   (AU) ................................ 2017903742

(51) Int. Cl.
*F02M 69/08*    (2006.01)
*F02M 67/02*    (2006.01)
(Continued)

(52) U.S. Cl.
CPC ............ *F02M 69/08* (2013.01); *F02M 67/02* (2013.01); *B64C 2201/044* (2013.01);
(Continued)

(58) Field of Classification Search
CPC ........ F02M 67/02; F02M 69/08; F02M 25/00; F02M 43/00; F02D 19/00
(Continued)

(56) References Cited

U.S. PATENT DOCUMENTS 4,936,279 A    6/1990   Ragg
5,156,133 A    10/1992  Sugimoto et al.
(Continued)

FOREIGN PATENT DOCUMENTS

WO    WO-1998/001667 A1    1/1998
WO    WO-2001/014738 A1    3/2001

OTHER PUBLICATIONS

International Search Report and Written Opinion of the International Searching Authority issued in PCT/AU2018/051009, dated Nov. 23, 2018; ISA/AU.
(Continued)

*Primary Examiner* — John Kwon
(74) *Attorney, Agent, or Firm* — Harness, Dickey & Pierce, P.L.C.

(57) ABSTRACT

A method of operating an internal combustion engine system having a fuel injection system including a fluid delivery means operable to deliver a fuel entrained in gas directly into a combustion chamber. The method comprises supplying pressurised gas to the fluid delivery means from a gas supply system, and regulating gas pressure in the gas supply system. The gas pressure in the gas supply system may be regulated during a lag period between commencement of engine cranking and the delivery of fuel at a requisite fuel pressure to the fuel injection system. Regulating gas pressure in the gas supply system comprises opening the fluid delivery means to selectively allow gas to pass into the combustion chamber to relieve pressure in the gas supply system. Optionally, regulating gas pressure in the gas supply
(Continued)

system may also comprise opening the fluid delivery means to selectively allow pressurised gas to flow from the combustion chamber to the gas supply system so as to pressurise the gas supply system.

24 Claims, 6 Drawing Sheets

(51) Int. Cl.
  *F02B 75/12* (2006.01)
  *F02D 7/02* (2006.01)
  *F02D 41/06* (2006.01)
  *F02D 41/30* (2006.01)

(52) U.S. Cl.
  CPC .......... *F02B 2075/125* (2013.01); *F02D 7/02* (2013.01); *F02D 41/062* (2013.01); *F02D 2041/3088* (2013.01); *F02D 2400/04* (2013.01)

(58) Field of Classification Search
  USPC .................. 123/531, 533, 575, 576, 577
  See application file for complete search history.

(56) References Cited

U.S. PATENT DOCUMENTS

| | | | |
|---|---|---|---|
| 5,345,903 A | | 9/1994 | Motose et al. |
| 5,345,919 A | | 9/1994 | Uchinami |
| 6,164,268 A | * | 12/2000 | Worth .................... F02M 67/02 |
| | | | 123/533 |
| 6,386,186 B1 | * | 5/2002 | Coplin .................. F02B 61/045 |
| | | | 123/521 |
| 6,435,165 B1 | | 8/2002 | Hill et al. |
| 9,441,552 B2 | * | 9/2016 | Coplin .................. F02M 67/02 |
| 2012/0227389 A1 | * | 9/2012 | Hinderks ................ F01L 1/146 |
| | | | 60/317 |
| 2016/0305382 A1 | * | 10/2016 | Kim ....................... F02M 61/12 |
| 2020/0063669 A1 | * | 2/2020 | Bleechmore ........ F02D 41/0002 |

OTHER PUBLICATIONS

International Preliminary Report on Patentability issued in PCT/AU2018/051009 dated Sep. 11, 2018.

* cited by examiner

CONTROL STRATEGY FOR ENGINE OPERATION

CROSS REFERENCE TO RELATED APPLICATIONS

This application is a U.S. National Phase Application under 35 U.S.C. 371 of International Application No. PCT/AU2018/051009 filed on Sep. 14, 2018, which claims the benefit of priority from Australian Patent Application No. 2017903742 filed on Sep. 14, 2017. The entire disclosures of all of the above applications are incorporated herein by reference.

TECHNICAL FIELD

This invention relates to operation of an internal combustion engine having a fuel injection system including a fluid delivery means operable to deliver a fuel entrained in gas directly into a combustion chamber of the engine.

The invention may provide a method of operating such an engine. The method may provide a strategy for controlling the engine during a start-up phase. The method may also provide a strategy for controlling the engine when engine shut-down is imminent.

The invention may also provide an engine operating in accordance with the method disclosed, a vehicle powered by such an engine, and an engine management system operable to perform the method disclosed.

BACKGROUND ART

The following discussion of the background art is intended to facilitate an understanding of the present invention only. The discussion is not an acknowledgement or admission that any of the material referred to is or was part of the common general knowledge as at the priority date of the application.

It is known to deliver fuel into a combustion chamber of an internal combustion engine using a dual-fluid direct injection system. With one such arrangement, a metered quantity of liquid fuel is delivered into a combustion chamber of the engine entrained in a gas (typically air). Typically, the metered quantity of fuel is delivered into a mixing zone and then delivered into the combustion chamber with the assistance of the gas flowing through the mixing zone to entrain the fuel. Such an arrangement is known as a gas-assist fuel delivery system, and more particularly an air-assist fuel delivery system in the case where the gas comprises air.

In order for there to be reliability and repeatability in the fuel injection and ignition process, it is necessary that there be a controlled differential between the pressure of the supply of fuel and the pressure of the supply of gas into which the fuel is to be delivered for subsequent entrainment and delivery.

An important factor in achieving rapid and reliable start-up of an engine using a gas-assist fuel delivery system is the need for a ready supply of compressed gas at an appropriate pressure to ensure effective fuel delivery to the engine early in the start-up phase of the engine. This necessitates that there not only be sufficient gas available, but also that the gas be at a pressure which facilitates the requisite pressure differential with respect to the pressure of the supply of fuel to ensure a satisfactory dual fluid delivery event. Typically, this requires that the pressure of the gas supply be regulated.

The need to regulate the pressure of the gas supply can usually be addressed by provision of a gas regulator of known kind in a gas supply system, as would readily be understood by a person skilled in the art.

However, it may not always be possible to provide a gas regulator with the gas supply system. Further, even where a gas supply system has a gas regulator, there may in certain circumstances be a need to provide supplementary regulation to augment regulation provided by the gas regulator.

By way of example, in the case of an internal combustion engine having a gas-assist fuel delivery system for an unmanned aerial vehicle (UAV), it may not be possible or desirable to provide the gas supply system with a gas pressure regulator (as will be explained further below). With this in mind, the invention will primarily be discussed in relation to its application to a UAV. However, it should be understood that the invention may have application to various other vehicles, machines, apparatus and devices having internal combustion engines using a gas-assist fuel delivery system. Such internal combustion engines using a gas-assist fuel delivery system may comprise engines in either single-cylinder or multi-cylinder configurations, as well as both two-stroke and four-stroke engines.

There may be various operational and economic advantages realisable from fueling internal combustion engines for UAVs by way of a gas-assist fuel delivery system. One such engine may, for example, be a small, reciprocating piston two-stroke engine, although it could of course be any other appropriate internal combustion engine, as would be understood by a person skilled in the art.

It should also be noted that there are often certain packaging constraints in relation to engines for UAVs; for example, there are likely to be packaging constraints associated with space and weight limitations for an engine to be used with a UAV.

In order to satisfy specific packaging and weight requirements, and to also reduce engine complexity, it may be that a UAV engine featuring a gas-assist fuel delivery system would omit certain engine components which otherwise might have been utilised. In particular, the engine may not include a gas pressure regulator in the gas supply system. Further, the engine may also not have a battery and starter-motor system, in which case the engine may be adapted to be cranked for start-up by an external torque drive releasably coupled to the engine crankshaft. Electrical energy for operating various engine components and systems (such as an electronic engine management system, an ignition system and an electrical fuel pump) may be generated upon cranking and running of the engine. Still further, the UAV engine would likely have a fuel pump of a size to satisfy fuel demand, without much surplus capacity. Finally, pressurised gas for the gas supply system may be provided by way of a compressor driven mechanically by the engine.

With such an arrangement where the compressor is driven mechanically by the UAV engine, the compressor operates immediately upon cranking of the engine, progressively increasing the pressure in the gas supply system. However, in a system without a battery there is typically a delay before the engine management system and electrical fuel pump are energised sufficiently to be operable (with electrical energy for operating the engine management system and the electrical fuel pump being generated upon cranking and running of the engine, as noted above).

As the cranking speed is typically high in arrangements where an external torque drive is used (in the order of about 2,000 to 3,000 rpm), it is likely that the gas pressure generated by the compressor (which is driven directly by the engine as it is undergoing cranking) will rise rapidly to a level well beyond what it should be to satisfy the requisite pressure differential with respect to the pressure of the supply of fuel. Accordingly, in the absence of a gas pressure regulator, an alternative means is required to regulate the gas pressure for the gas-assist fuel delivery system of such a UAV engine.

Desirably, the requisite gas regulation should be achieved rapidly during the initial cranking part of the engine start-up phase. This is to ensure that fuel injection can occur and the engine can commence firing early in the start-up phase.

In WO 01/014738, the present Applicant proposed a method of controlling gas pressure in a dual fluid injection system wherein the gas pressure is used to deliver a metered quantity of fuel to a combustion chamber of an internal combustion engine. The gas typically comprises air. On detection of an abnormal fuel supply condition, air pressure in the fuel injection system is regulated to a level less than the fuel pressure deliverable by a fuel supply system of the engine under the abnormal fuel supply condition, such that fuel may then be delivered as required to the dual fluid injection system. One example of an abnormal fuel supply condition contemplated involves cranking under cold ambient conditions, where current draw from a battery during cranking may cause the terminal voltage of the battery to drop to a level insufficient for an electrical fuel pump of the fuel supply system to operate correctly so that fuel is supplied at a satisfactory pressure to a fuel metering unit of the fuel injection system. Alternatively, it may result in the fuel pressure in the fuel supply system rising at a lower rate than air pressure in an air pressure supply system. This may result in the pressure of air in the air supply system being higher than the fuel pressure which is supplied by the electrical fuel pump under such cold cranking and low battery voltage conditions, and hence it would not be possible to meter fuel for delivery to the engine by way of the air in the normal manner.

It is notable that the engine system to which the method disclosed in WO 01/014738 is applicable, features an air regulator which ensures that the air pressure does not exceed a predetermined maximum value. Further, the engine system requires a battery for engine cranking and for energising the electrical fuel pump. As such, the method disclosed in WO 01/014738 would not likely be applicable to an engine system configured to satisfy the specific packaging and weight requirements discussed above for a UAV.

It is against this background that the present invention was developed.

However, while the invention was primarily developed and is being discussed in relation to an internal combustion engine applicable for a UAV, it should be understood that the invention may have application to various other vehicles, machines, apparatus and devices having internal combustion engines using a gas-assist fuel delivery system. Such internal combustion engines may comprise engines in either single-cylinder or multi-cylinder configurations. Further, the engines may be either spark-ignition engines or compression-ignition engines, as well as both two-stroke and four-stroke engines.

SUMMARY OF INVENTION

According to a first aspect of the invention there is provided a method of operating an internal combustion engine system having a fuel injection system including a fluid delivery means operable to deliver a fuel entrained in gas directly into a combustion chamber and a gas supply system for supplying pressurised gas to the fluid delivery means without a gas pressure regulator, the method comprising supplying pressurised gas to the fluid delivery means from the gas supply system, wherein the pressurised gas is generated initially in response to cranking of the engine, and regulating gas pressure in the gas supply system by interrupting an initial increase in gas pressure in response to cranking of the engine prior to delivery of fuel into the combustion chamber, wherein regulating gas pressure in the gas supply system comprises opening the fluid delivery means to selectively allow gas to pass into the combustion chamber to relieve pressure in the gas supply system.

Regulating gas pressure in the gas supply system may also comprise subsequently opening the fluid delivery means to selectively allow pressurised gas to flow from the combustion chamber to the gas supply system so as to pressurise the gas supply system. This may be advantageous in rapidly increasing pressure in the gas supply system, particularly re-pressurising the gas supply system after pressure therein has initially been relieved. With this arrangement, the same device (i.e. the fluid delivery means) is used to selectively allow gas to pass into the combustion chamber to relieve pressure in the gas supply system and to selectively allow pressurised gas to flow from the combustion chamber to the gas supply system so as to pressurise the gas supply system.

Opening the fluid delivery means to allow gas to pass into the combustion chamber may comprise a single opening event or a plurality of successive opening events.

Similarly, opening the fluid delivery means to allow pressurised gas to flow from the combustion chamber to the gas supply system may comprise a single opening event or a plurality of successive opening events.

The fluid delivery means may comprise a fluid injector operable under the control of a control system. The operation of the fluid injector may be controlled in terms of the timing of opening and the duration of opening thereof, according to the extent of pressure regulation required.

The operation of an internal combustion engine system may comprise a start-up phase and a running phase. The start-up phase may comprise one or more initial combustion events and a subsequent flare period. Flare occurs following initial combustion and typically causes the engine speed to initially rise before falling to a more steady (idle) condition.

The method has been devised primarily as a control strategy to control operation of an engine during the start-up phase. Accordingly, it may be performed in a start-up phase of the engine. However, the method may be performed during the running phase of the engine. If the method is performed during the running phase of the engine, the method may further comprise sensing the fuel pressure.

The method may further comprise supplying a metered quantity of fuel to the fluid delivery means for delivery into the combustion chamber entrained in gas following regulation of gas pressure in the gas supply system.

The method may further comprise cranking of the engine to initiate the start-up phase. The cranking may be by way of an external torque drive releasably coupled to the engine crankshaft.

The pressurised gas may be generated by a compressor operably coupled to the engine.

The pressurised gas may comprise air. The air may comprise ambient air which is subsequently compressed to provide pressurised air.

The method may further comprise generating electrical energy, the electrical energy being generated initially in response to cranking of the engine.

The method may further comprise energising an electrical fuel pump to deliver fuel to the fluid delivery means, the electrical fuel pump being energised using electrical energy generated in response to cranking of the engine.

Due to the way that electrical energy is generated and the electrical fuel pump is energised, there may be a lag period between commencement of engine cranking and the delivery of fuel at a requisite fuel pressure to the fluid delivery means. Consequently, the gas pressure in the gas supply system may increase at a faster rate than the fuel pressure, which is problematic in terms of achieving a consistent differential between the fuel pressure and gas pressure at the time of the dual-fluid delivery. Accordingly, the increase in gas pressure is interrupted during the lag period by way of regulation, with the regulation comprising opening the fluid delivery means to allow gas to pass into the combustion chamber to relieve pressure in the gas supply system. This interruption allows the fuel pressure to overtake the gas pressure and attain a target differential pressure to ensure subsequent consistent fuel delivery by the fluid delivery means.

With this arrangement, gas pressure in the gas supply system can be reduced, and then increased, all during the start-up phase of the engine and all by way of the fluid delivery means. This interrupts increasing gas pressure in the gas supply system, allowing the fuel pressure to catch-up to and overtake the gas pressure, hence facilitating achievement of a target differential pressure to ensure subsequent consistent fuel delivery by the fluid delivery means.

The gas pressure in the gas supply system may be reduced considerably (for example, where required, to approach zero) to ensure that fuel can be subsequently consistently metered at a target differential pressure. The air pressure may thereafter be caused to rise again (say from zero) without any combustion events occurring, until the air pressure reaches a minimum pressure before a combustion event is attempted.

The method may be used as a control strategy employed during engine start-up.

The method may be used as a control strategy to control operation of an engine when engine shut-down is imminent. In such a case, the method may involve opening the fluid delivery means when engine shut-down is imminent to discharge pressurised air from the gas supply system in preparation for the next engine start-up event (thereby ensuring that the air pressure in the gas supply system is not relatively high for that next start-up event).

According to a second aspect of the invention there is provided a method of operating an internal combustion engine system having a fuel injection system including a fluid delivery means operable to deliver a fuel entrained in gas directly into a combustion chamber and a gas supply system for supplying pressurised gas to the fluid delivery means without a gas pressure regulator, the method comprising: cranking the engine to initiate a start-up phase; generating compressed gas in the gas supply system for delivery of gas to the fluid delivery means, wherein the pressurised gas is generated initially in response to cranking of the engine, the compressed gas being generated in response to cranking the engine; generating a supply of electrical energy in response to cranking of the engine; energising an electrical fuel pump for the delivery of fuel to the fluid delivery means, the electrical fuel pump being energised using electrical energy generated in response to cranking of the engine; wherein there is a lag period between commencement of engine cranking and the delivery of fuel at a requisite fuel pressure to the fluid delivery means; and regulating gas pressure in the gas supply system during the lag period by interrupting an initial increase in gas pressure in response to cranking of the engine prior to delivery of fuel into the combustion chamber, wherein regulating gas pressure in the gas supply system comprises opening the fluid delivery means to selectively allow gas to pass into the combustion chamber to relieve pressure in the gas supply system.

The method according to the second aspect of the invention may have any one or more of the features referred to above in relation to the first aspect of the invention, as might be appropriate. In particular, the feature of regulating gas pressure in the gas supply system in the method according to the second aspect of the invention may also comprise opening the fluid delivery means to selectively allow pressurised gas to flow from the combustion chamber to the gas supply system so as to pressurise the gas supply system.

Regulating gas pressure in the gas supply system by opening the fluid delivery means to selectively allow pressurised gas to flow from the combustion chamber to the gas supply system so as to pressurise the gas supply system may assist in increasing gas pressure in the gas supply system following an initial reduction in the pressure thereof.

According to a third aspect of the invention there is provided a method of operating an internal combustion engine system, the engine system having a fuel injection system including a fluid delivery means operable to deliver a fuel entrained in a gas directly into a combustion chamber and a gas supply system for supplying pressurised gas to the fluid delivery means without a gas pressure regulator, the method comprising supplying pressurised gas to the fluid delivery means from the gas supply system, and regulating gas pressure in the gas supply system by interrupting an initial increase in gas pressure in response to cranking of the engine prior to delivery of fuel into the combustion chamber, wherein regulating gas pressure in the gas supply system comprises opening the fluid delivery means to selectively allow gas to pass into the combustion chamber to relieve pressure in the gas supply system; and wherein regulating gas pressure in the gas supply system also comprises subsequently opening the fluid delivery means to selectively allow pressurised gas to flow from the combustion chamber to the gas supply system so as to pressurise the gas supply system, whereby during a period between commencement of engine cranking and delivery of fuel into the combustion chamber gas pressure in the gas supply system is initially relieved and then caused to rise.

With this method, the gas supply system of the engine may be re-pressurised after pressure therein has initially been relieved.

The method according to the third aspect of the invention may have any one or more of the features referred to above in relation to the first or second aspects of the invention, as might be appropriate.

According to a fourth aspect of the invention there is provided an internal combustion engine system, the internal combustion engine system being operated in accordance with a method according to the first, second or third aspect of the invention.

The engine system according to the fourth aspect of the invention may comprise a single-cylinder engine or a multi-cylinder engine.

In the case of a multi-cylinder engine, the method may be performed utilising all cylinders, or alternatively using only one or some but not all cylinders, to receive gas discharged from the gas supply system to enable pressure regulation for the gas supply system. By way of example, one cylinder may be used to receive gas discharged from the gas supply system for the purpose of pressure regulation while another cylinder may be used to receive a metered quantity of fuel entrained in gas for ignition and subsequent combustion in the respective combustion chamber.

The engine system according to the fourth aspect of the invention may include a fuel and gas rail unit, with the gas supply system comprising the gas portion of the fuel and gas rail unit.

The engine system according to the fourth aspect of the invention may comprise a spark-ignition engine or a compression-ignition engine.

The engine system according to the fourth aspect of the invention may comprise a two-stroke or a four-stroke engine.

The engine system according to the fourth aspect of the invention may further comprise a fluid injector to provide the fluid delivery means.

The engine system according to the fourth aspect of the invention may be fuelled with any appropriate fuel, as would be understood by a person skilled in the art, including for example gasoline and heavy fuels (e.g. military fuels such as JP-5 and JP-8).

According to a fifth aspect of the invention there is provided a vehicle powered by an internal combustion engine system according to the fourth aspect of the invention.

The vehicle may comprise a UAV.

According to a sixth aspect of the invention there is provided an engine management system operable to perform a method according to the first or second aspect of the invention.

The engine management system may be energised initially by electrical energy being generated in response to cranking of the engine.

The engine management system may be operable to respond to information received by various sensors to control or adjust one or more operating parameters of the engine, including controlling operation of the fluid delivery means.

The engine management system may control operation of the fluid delivery means to follow approximately the same operating sequence (timing and duration of opening) as would normally occur during operation of the engine, or alternatively may vary or optimise the operating sequence according to the extent of pressure regulation required.

BRIEF DESCRIPTION OF THE DRAWINGS

Further features of the present invention are more fully described in the following description of several non-limiting embodiments thereof. This description is included solely for the purposes of exemplifying the present invention. It should not be understood as a restriction on the broad summary, disclosure or description of the invention as set out above. The description will be made with reference to the accompanying drawings in which.

Figure 1:
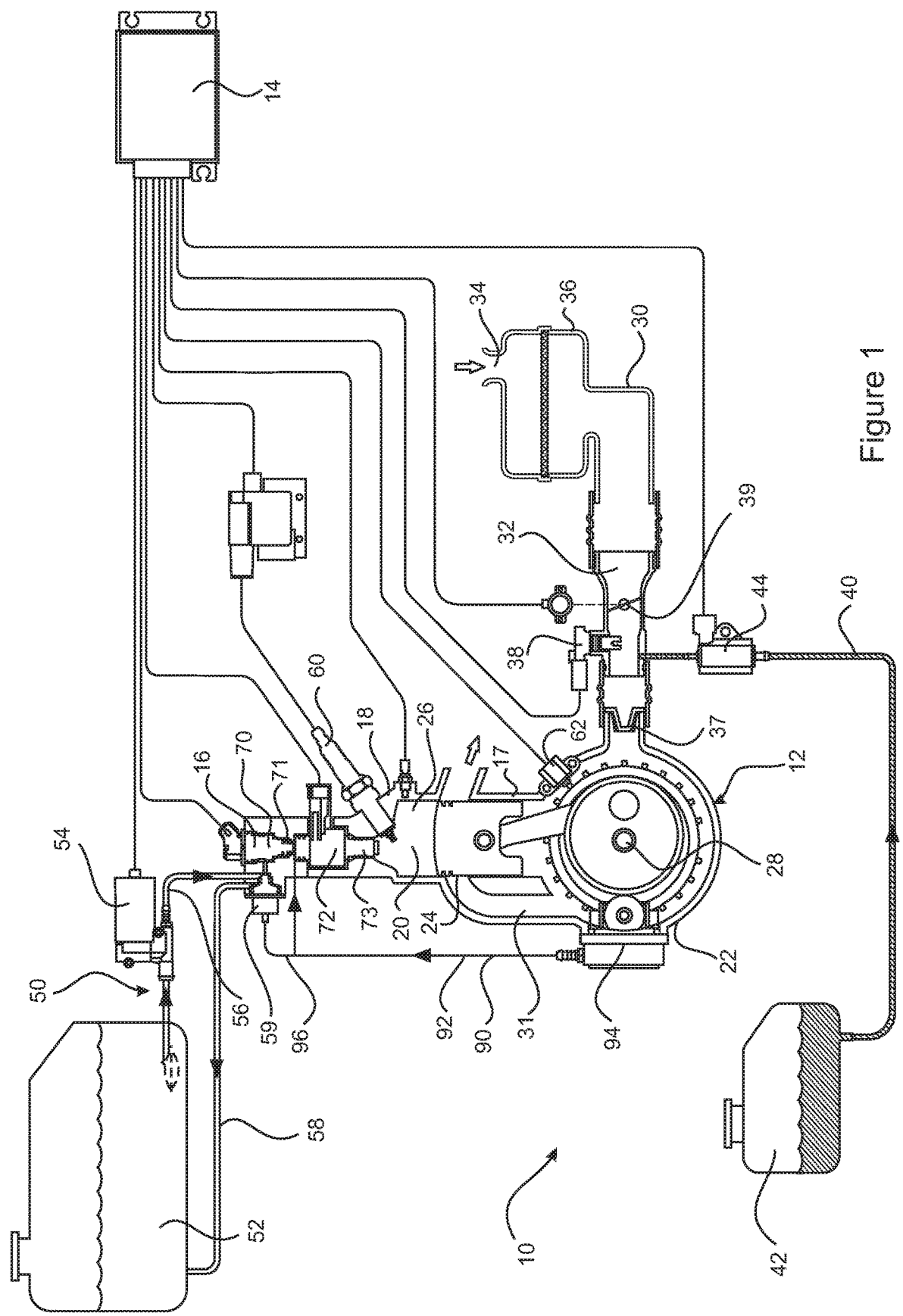
FIG. 1 is a schematic representation of an engine system operable in accordance with methods disclosed herein.

The drawings shown are not necessarily to scale, with emphasis instead generally being placed upon illustrating the principles of the present invention.

The figures depict an embodiment of the invention. The embodiments each illustrate a certain configuration; however, it is to be appreciated that the invention can be implemented by way of many different configurations, as would be obvious to a person skilled in the art, whilst still embodying the present invention. These configurations are to be considered within the scope of this invention.

DESCRIPTION OF EMBODIMENTS

In the following detailed description, the present invention is described in connection with several preferred embodiments. However, to the extent that the following description is specific to a particular embodiment or a particular use of the present techniques, it is intended to be illustrative only and merely provides a concise description of the exemplary embodiment. Accordingly, the present invention is not limited to the specific embodiments described below, but rather the invention includes all alternatives, modifications, and equivalents falling within the true scope of the appended claims.

The embodiments will be described with reference to an internal combustion engine system 10 as shown schematically in FIG. 1. The internal combustion engine system 10 has been devised particularly for use with a UAV, although it may of course have other applications. In order to satisfy the packaging and weight requirements in relation to use with a UAV, and to also reduce complexity, the engine system 10 does not have certain components which would otherwise be expected, as will become apparent later.

The engine system 10 comprises a small, single-cylinder reciprocating piston two-stroke engine 12 operating under the control of an electronic control unit (ECU) 14. The engine 12 may be fuelled with any appropriate fuel, including gasoline and heavy fuels (e.g. military fuels such as JP-5 and JP-8).

The engine system 10 further comprises a dual-fluid direct injection system 16 facilitating a gas-assist fuel delivery process. In the embodiments to be described, the gas comprises air thereby providing an air-assist fuel delivery process wherein fuel entrained in the air is delivered directly into a combustion chamber of the engine 12.

The engine 12 comprises an engine block 17 and a cylinder head 18 which together define a cylinder 20 and a crankcase 22. A piston 24 is accommodated in the cylinder 20. The cylinder 20 and the piston 24 cooperate to define the combustion chamber 26.

The piston 24 is connected to a crankshaft 28 rotatably supported within the crankcase 22 in known manner.

An air intake system 30 is provided to deliver combustion air into the crankcase 22 for delivery into the combustion chamber 26 by crankcase compression via transfer port 31. The air intake system 30 includes an air intake path 32 extending between an intake end 34 incorporating an air filter 36, and an outlet end 37 opening into the crankcase 22. The air intake path 32 has an air flow sensor 38 providing signals to the ECU 14 indicative of air flow. The air intake path 32 also has an air flow control valve 39 operable under the control of the ECU 14. It should however be noted that in other arrangements the air intake path 32 may not necessarily include an air flow sensor, and that the inclusion of the air flow sensor 38 in the current embodiment in no way limits the scope of the present invention.

A lubrication system 40 is provided to deliver lubricating oil into the air intake path 32 for entrainment in intake air flow into the crankcase 22. The lubrication system 40 includes an oil reservoir 42 and an oil pump 44 which is operable under the control of the ECU 14.

A fuel supply system 50 is provided to deliver fuel to the dual-fluid direct injection system 16. The fuel supply system 50 includes a fuel reservoir 52 and an electrical fuel pump 54 which is operable under the control of the ECU 14. The fuel supply system 50 further includes a fuel supply line 56 adapted to receive fuel from the fuel reservoir 52 and to deliver it to the dual-fluid direct injection system 16, and a fuel return line 58 to return excess liquid fuel to the fuel reservoir 52 in known manner. The fuel pump 54 is associated with the fuel supply line 56. The fuel supply system 50 also includes a fuel pressure regulator 59 for regulating the fuel pressure against air pressure in the dual-fluid direct injection system 16, as would be understood by a person skill in the art.

An ignition system 60 is provided for igniting a combustible mixture within the combustion chamber 26. The ignition system 60 is operable under the control of the ECU 14.

A sensor 62 is operably arranged to provide signals to the ECU 14 indicative of the speed and rotational position of the crankshaft 28.

Figure 2:
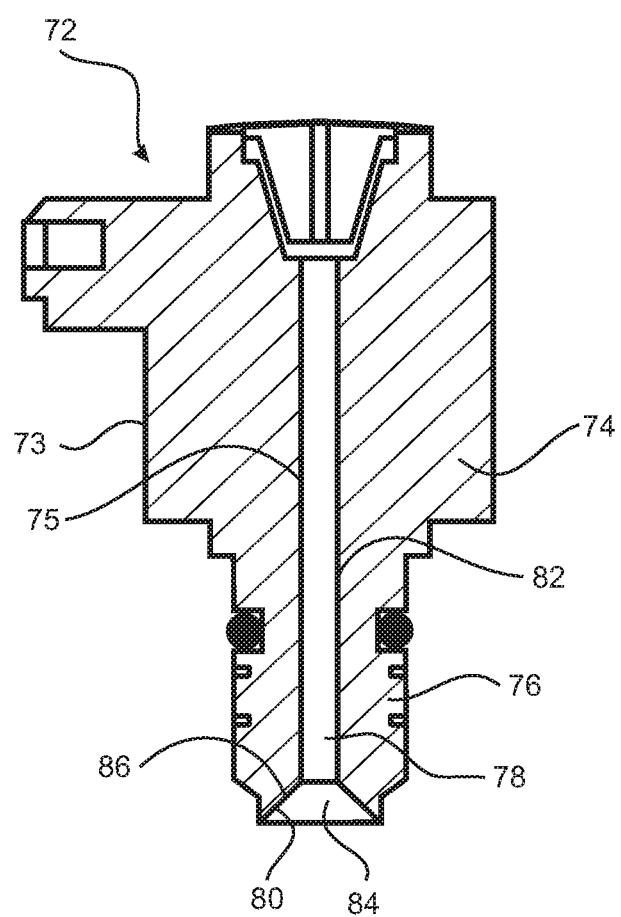
FIG. 2 is a schematic cross-sectional view of a fluid delivery device used in the engine system.

The dual-fluid direct injection system 16 facilitating the air-assist fuel delivery process comprises a fuel metering device 70 and a fluid delivery device 72 operating in tandem. Fuel received from the fuel metering device 70 is delivered into a mixing zone 75 (as best seen in FIG. 2) for mixing with air received from a pressurised supply to provide an air-fuel mixture for injection by the fluid delivery device 72 into the combustion chamber 26. In the arrangement shown, the fuel metering device 70 comprises a fuel injector 71, and the fluid delivery device 72 comprises a fluid delivery injector 73. The pressure of fuel supplied to the fuel metering device 70 is controlled by the fuel pressure regulator 59, as alluded to above.

As will be appreciated from a consideration of FIG. 2, the fluid delivery device 72 includes a main body 74 having a nozzle portion 76 communicating with the combustion chamber 26. The mixing zone 75 is effectively provided within the nozzle portion 76 at the lower end of the fluid delivery device 72. The fluid delivery device 72 further includes an electronically-operable (solenoid) delivery valve 78 associated with the nozzle portion 76. The delivery valve 78 is operable in known manner to open and close a valve port 80 in the nozzle portion 76 to control delivery of the air-fuel mixture through the delivery valve 78 into the combustion chamber 26. In the arrangement shown, the delivery valve 78 is in the form of a poppet valve comprising a valve stem 82, and a valve head 84 which cooperates with a valve seat 86 formed in the nozzle portion 76 to define the valve port 80.

The delivery valve 78 and its associated features (including valve stem 82, valve head 84, valve seat 86 and valve port 80) are depicted schematically in FIG. 2 for illustrative purposes only. It should, however, be understood that the delivery valve 78 may take any other appropriate form as would be understood by a person skilled in the art, including one where the valve stem 82 may be of hollow construction to enable the flow of the air-fuel mixture along a portion of the valve stem 82.

The fuel metering device 70 and the fluid delivery device 72 are each operable in response to control signals received from the ECU 14. The operation of each device 70, 72 is controlled in terms of the timing of opening and the duration of opening thereof in a regime determined by the ECU 14.

A gas supply system 90 is provided to supply pressurised air to the dual-fluid direct injection system 16. More particularly, the gas supply system 90 is operable to supply air under pressure to the fluid delivery device 72, where on opening of the fluid delivery device 72 pressurised air can flow through the fluid delivery device 72 and be delivered into the combustion chamber 26. The pressurised air communicates with the mixing zone 75, and when the fluid delivery device 72 is opened, any fuel delivered into the mixing zone 75 by the fuel metering device 70 is entrained by the pressurised air and delivered through the valve port 80 into the combustion chamber 26.

The gas supply system 90 comprises an air flow line 92 extending between an air compressor 94 and the fluid delivery device 72. The air compressor 94 is driven mechanically by the engine 12 and as such operates independently of the ECU 14; that is, the air compressor 94 is not controlled by the ECU 14. In the arrangement shown, the air compressor 94 receives intake air from the air intake system 30 via the crankcase 22; that is, the intake of the air compressor 94 is in communication with the crankcase 22 to receive intake air for compression.

The fuel pressure regulator 59 is in communication with the gas supply system 90, as shown in FIG. 1. More particularly, the fuel pressure regulator 59 is in communication with air flow line 92 via branch line 96.

The ECU 14 is configured to be responsive to information received by various sensors by controlling and/or adjusting one or more operating parameters of the engine system 10. The ECU 14 includes a timing means (not shown) such as a counter operable to delay initiation of certain of the operating parameters of the engine system 10 for a prescribed time duration.

It is notable that the engine 12 does not have a battery and starter-motor system. Instead, the engine 12 is adapted to be cranked for start-up by an external torque drive releasably coupled to the engine crankshaft 28. Further, electrical energy for operating various engine components and systems (such as the ECU 14, the electrical fuel pump 54, the ignition system 60, the fuel metering device 70, and the fluid delivery device 72) is generated by a generator (not shown) mechanically coupled to the engine 12 and operable upon cranking and subsequent running of the engine 12.

Further, it is notable that the gas supply system 90 does not include an air pressure regulator. However, regulation of air pressure in the gas supply system 90 is necessary as the air compressor 94 is operably coupled to the engine 12, and as such operates immediately upon cranking of the engine 12, progressively increasing the pressure in the gas supply system 90.

As the air compressor 94 operates immediately upon cranking of the engine, the gas supply system 90 commences to be pressurised before electrical energy is available for energising the electrical fuel pump 54.

In order for there to be reliability and repeatability in the fuel injection and ignition process, it is necessary that there be a consistent differential between the fuel pressure at fuel metering device 70 within the fuel supply system 50 and the pressure of air in the gas supply system 90 at the time of the dual-fluid delivery. The fuel pressure regulator 59 is provided for the purpose of establishing and maintaining the requisite differential between the fuel pressure and air pressure. The fuel pressure regulator 59 does this by referencing the pressure of air in the gas supply system 90; specifically, by referencing the air pressure in air flow line 92 through communication via branch line 96. In other words, the fuel pressure regulator 59 regulates the fuel pressure against the air pressure in the gas supply system 90, thereby ensuring the requisite pressure differential irrespective of the air pressure during the start-up phase and also during the running phase of the engine 12.

It is desirable that the pressure differential be in the range of 70 kPa to 300 kPa, and preferably about 250 kPa.

As the cranking speed of the engine 12 resulting from application of the external torque drive is typically high (in the order of about 2,000 to 3,000 rpm), it is likely that the air pressured generated by the air compressor 94 during start-up will rise rapidly to a level well beyond what is desirable for effective operation of the dual-fluid direct injection system 16. Accordingly, there is a need to regulate the air pressure.

The present embodiments are directed to example methods of operating the engine system 10 in accordance with a control strategy providing the requisite air pressure regulation.

Desirably, the example methods of operating the engine system 10 enable the requisite air pressure regulation to be achieved rapidly during the initial cranking part of the engine start-up phase, thereby ensuring that fuel metering and subsequent air-fuel delivery events can occur and the engine can commence firing early in the start-up phase. This can be an important factor when a UAV engine using a heavy fuel is intended for operation in adverse or hostile conditions where rapid and reliable engine start-up is essential.

Broadly, the present embodiments provide a control strategy which selectively opens the fluid delivery device 72 to allow pressurised air in the gas supply system 90 to pass into the combustion chamber 26 to relieve pressure in the gas supply system 90. In other words, a quantity of pressurised air in the gas supply system 90 is selectively "dumped" into the combustion chamber 26.

In certain applications, regulating gas pressure in the gas supply system 90 may also comprise opening the fluid delivery device 72 to selectively allow pressurised gas to flow from the combustion chamber to the gas supply system 90 so as to pressurise the gas supply system 90. In other words, a quantity of pressurised gas in the combustion chamber 26 is selectively "pumped" into the gas supply system 90. This may be advantageous in rapidly increasing pressure in the gas supply system 90, particularly in respect of re-pressurising the gas supply system 90 after pressure has been relieved through dumping of pressurised air into the combustion chamber 26. With this arrangement, the same device (i.e. the fluid delivery device 72) is used to selectively allow gas to pass into the combustion chamber 26 to relieve pressure in the gas supply system 90 and to selectively allow pressurised gas to flow from the combustion chamber 26 to the gas supply system 90 so as to pressurise the gas supply system 90.

The strategy of "pumping" pressurised gas in a combustion chamber into a gas supply system is known and is described in the Applicant's U.S. Pat. No. 4,936,279 and published PCT patent application WO98/01667, the contents of which are incorporated herein by way of reference and in which the strategy is referred to as a "pump-up" strategy. With this in mind, the strategy of selectively opening the fluid delivery device 72 to allow pressurised air in the gas supply system 90 to pass into the combustion chamber 26 to relieve pressure in the gas supply system may be referred to as a "pump-down" strategy.

Operation of the fluid delivery device 72 to allow air or pressurised gas to pass between the gas supply system 90 and the combustion chamber 26 may be effected by way of a single opening event or a plurality of successive opening events. Furthermore, the timing of opening and closing of the fluid delivery device 72 can be varied to manage or optimise how air pressure reduction occurs for specific requirements. In other words, opening and closing of the fluid delivery device 72 can be controlled to regulate air pressure in the gas supply system 90 according to specific circumstances that may arise during engine cranking, engine start-up or engine operation.

The control strategy may be implemented at the start-up phase and optionally also during the running phase of the engine 12. However, the control strategy has been devised primarily to control operation of the engine 12 during the start-up phase, and so the embodiments will be described further in that context.

Figure 3:
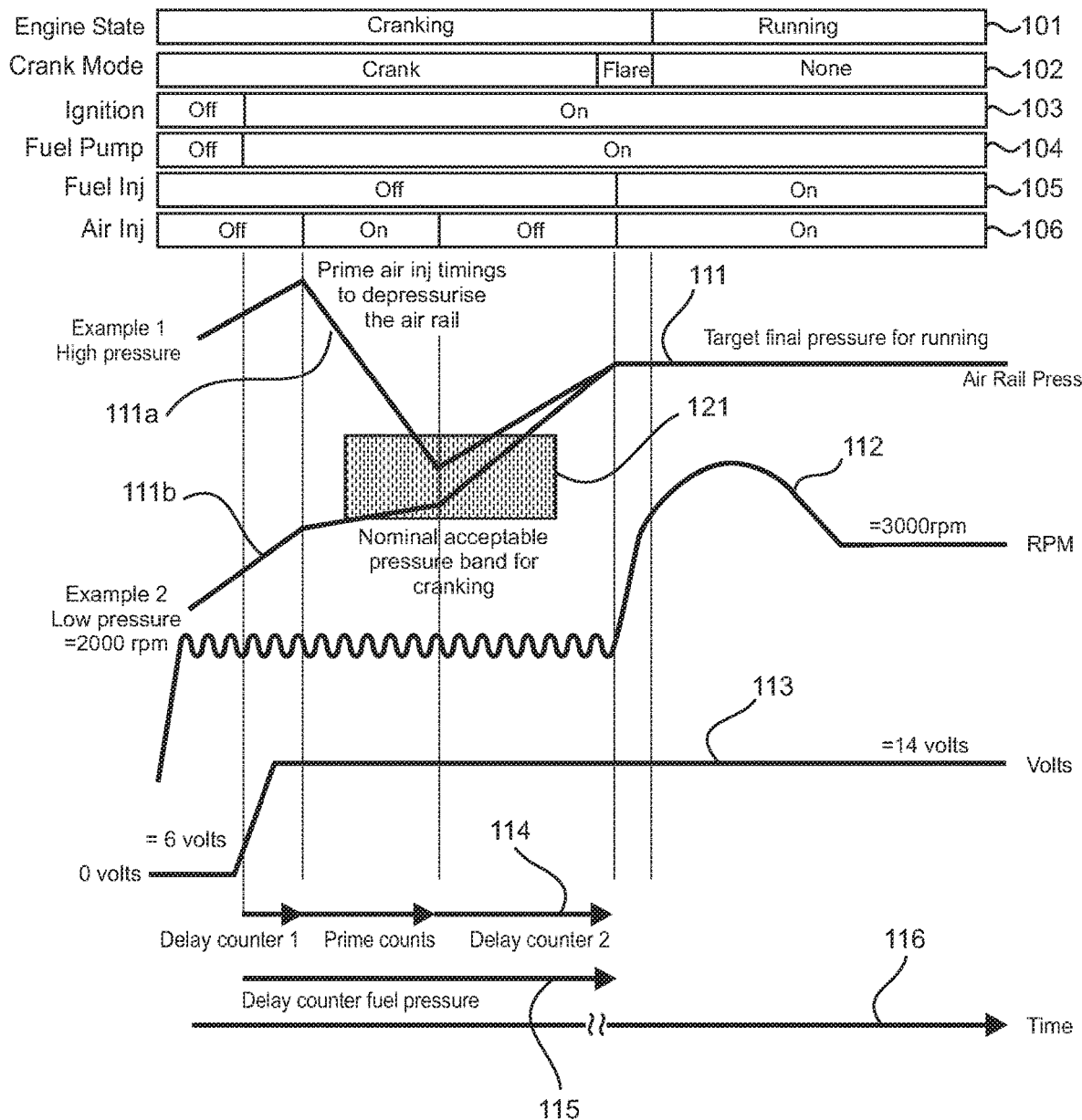
FIG. 3 provides a graphical representation of certain conditions and events occurring during engine start-up under an engine control strategy according to a first embodiment.

In FIG. 3, there is shown schematically a control strategy according to a first embodiment of the present invention, which involves multiple opening events of the fluid delivery device 72 in the start-up phase of the engine 12 to allow air to pass into the combustion chamber 26.

FIG. 3 includes a horizontal bar chart depicting certain conditions and events which occur during engine start-up. Specifically, the chart includes:
  a) bar 101 depicting the engine state (cranking or running);
  b) bar 102 depicting the crank mode (cranking or flare);
  c) bar 103 depicting the state of the ignition system 60 (active or inactive);
  d) bar 104 depicting the operation of the electrical fuel pump 54 (active or inactive);
  e) bar 105 depicting the operation of the fuel metering device 70 (active or inactive); and
  f) bar 106 depicting the operation of the fluid delivery device 72 (active or inactive).

The active state of the fluid delivery device 72 corresponds to operation of the fluid delivery device 72 to allow fluid (which may comprise air or an air-fuel mixture) to pass into the combustion chamber 26. As stated above, this may involve a single opening event or a plurality of successive opening events. In other words, each active state of the fluid delivery device 72 may feature a single opening event or a plurality of successive opening events.

In the inactive state, the fluid delivery device 72 is closed to prevent fluid flow into the combustion chamber 26.

FIG. 3 also includes several graphs relating various operating parameters of the engine 12 to conditions and events depicted in the horizontal bar chart. Specifically, the graphs comprise:
  a) plot line 111 relating to air pressure in the gas supply system 90;
  b) plot line 112 relating to the rotational speed of the crankshaft 28;
  c) plot line 113 relating to voltage delivered by the generator operably coupled to the engine 12;
  d) plot line 114 relating to timing of events connected with the fuel metering device 70 and the fluid delivery device 72 under the control of the ECU 14;
  e) plot line 115 relating to timing of events connected with the operation of the electrical fuel pump 54 under the control of the ECU 14; and f) plot line 116 relating to time.

FIG. 3 also depicts a zone 121 which represents a nominal pressure band for air pressure in the gas supply system 90 which is deemed acceptable for engine cranking.

The control strategy is depicted in FIG. 3 with application to two scenarios, identified as Example 1 and Example 2.

Example 1 relates to a scenario in which the air pressure (as depicted by plot 111*a*) in the gas supply system 90 is relatively high in early stages of the start-up phase of engine 12, and so the air pressure must be reduced in order to attain the requisite pressure differential with respect to the fuel pressure at fuel metering device 70.

Example 2 relates to a scenario in which the air pressure (as depicted by plot 111*b*) in the gas supply system 90 is relatively low in early stages of the start-up phase of engine 12, and so there is a need for the air pressure to rise, with the pressure rise being regulated in order to attain the requisite pressure differential with respect to the fuel pressure at fuel metering device 70.

From FIG. 3, it can be seen that the fluid delivery device 72 is initially inactive, then rendered active (where it is actuated over a number of engine cycles), and then rendered inactive again during cranking of the engine. The inactive and active states for the fluid delivery device 72 all occur prior to the fuel metering device 70 being rendered active. Subsequently, both the fuel metering device 70 and the fluid delivery device 72 are controlled to be active at the same time such that fuel is able to be metered for subsequent entrainment in air for delivery to the combustion chamber 26 over successive engine cycles in known manner to facilitate initial flare and subsequent running of the engine 12.

In respect of Example 1 in FIG. 3, operation of the fluid delivery device 72 during the first active period within the initial part of the start-up phase allows pressurised air in the gas supply system 90 to pass (i.e. be "dumped") into the combustion chamber 26 to relieve pressure in the gas supply system 90 and thereby provide pressure regulation. This "depressurisation" of the gas supply system 90 is typically effected by way of successive opening and closing events of the fluid delivery device 72 during this initial active period of operation. Upon attainment of the requisite pressure differential between the gas supply system 90 and the fuel pressure at fuel metering device 70, the fluid delivery device 72 and the fuel metering device 70, as part of a next active period, are actuated (i.e. opened and closed over a number of successive metering and delivery events) in the known manner such that metered quantities of fuel are entrained in the air and delivered into the combustion chamber 26 to initiate firing of the engine (flare). This completes the start-up phase of the engine 12, and thereafter the fuel metering device 70 and the fluid delivery device 72 operate as normal under the control of the ECU 14 during normal running of the engine.

It is notable in FIG. 3 that actuation of the electrical fuel pump 54 commences (see bar 104) before the fuel metering device 70 (see bar 105). This is to ensure that fuel is available at sufficient pressure for delivery into the pressurised air in the gas supply system 90 (and specifically the mixing zone 75), and to also allow priming of the fuel pump 54 if so required.

Further, it is notable that there is a lag period between commencement of engine cranking and the electrical fuel pump 54 being fully operational to deliver fuel at a requisite fuel pressure to the fluid delivery device 72. Specifically, there is an initial lag between engine cranking (as depicted in FIG. 3 by bar 101 and plot line 112 relating to the rotational speed of the crankshaft 28) and voltage delivered by the generator operably coupled to the engine 12 (as depicted in FIG. 3 by plot line 113). Further, there is a subsequent lag as the voltage delivered by the generator progressively rises to a requisite level (i.e. from 0 Volts to 14 Volts as depicted by way of example in FIG. 3). Within this subsequent lag, the voltage delivered by the generator reaches a threshold level (6 Volts as depicted by way of example in FIG. 3) at which the fuel pump 54 is first energised and rendered operational. As the voltage rises to the requisite level (14 Volts as depicted by way of example in FIG. 3), the pressure of fuel delivered by the electrical fuel pump 54 progressively increases so as to deliver fuel at the requisite fuel pressure to the fluid delivery device 72.

During this lag period between commencement of engine cranking and the electrical fuel pump 54 being fully operational to deliver fuel at a requisite fuel pressure to the fluid delivery device 72, the increase in gas pressure in the gas supply system 90 is interrupted by way of regulation, with the regulation comprising opening the fluid delivery device 72 to allow gas (air) to pass into the combustion chamber 26 to relieve pressure in the gas supply system. This interruption allows the fuel pressure to overtake the gas pressure to ensure that the fuel metering device 70 is able to subsequently consistently meter fuel at a target differential pressure.

In the control strategy according to this first embodiment, and specifically Example 1, the pressure in the gas supply system 90 is reduced considerably (say to approach zero) to ensure that the fuel metering device 70 is able to consistently meter fuel at a target differential pressure. Further, in the arrangement shown, delay counter 2 is invoked to ensure a sufficient passage of time after the fluid delivery device 72 has been rendered inactive (after having previously been active during the start-up phase) for air pressure in the gas supply system 90 to then increase to a level where fuel can be reliably and repeatably metered by the fuel metering device 70 and then directly injected into the combustion chamber 26 by the fluid delivery device 72.

As will be evident from the foregoing description of the control strategy with reference to FIG. 3, the control strategy according to the present invention is particularly suited to an engine system 10 where the dual-fluid fuel system 50 does not incorporate gas pressure regulation by way of a discrete device; that is, where there is no air pressure regulator. Air pressure regulation is instead provided by specific operation of the fluid delivery device 72 under control of the ECU 14 to manage the air pressure within the gas supply system 90 as may be required.

Figure 4:
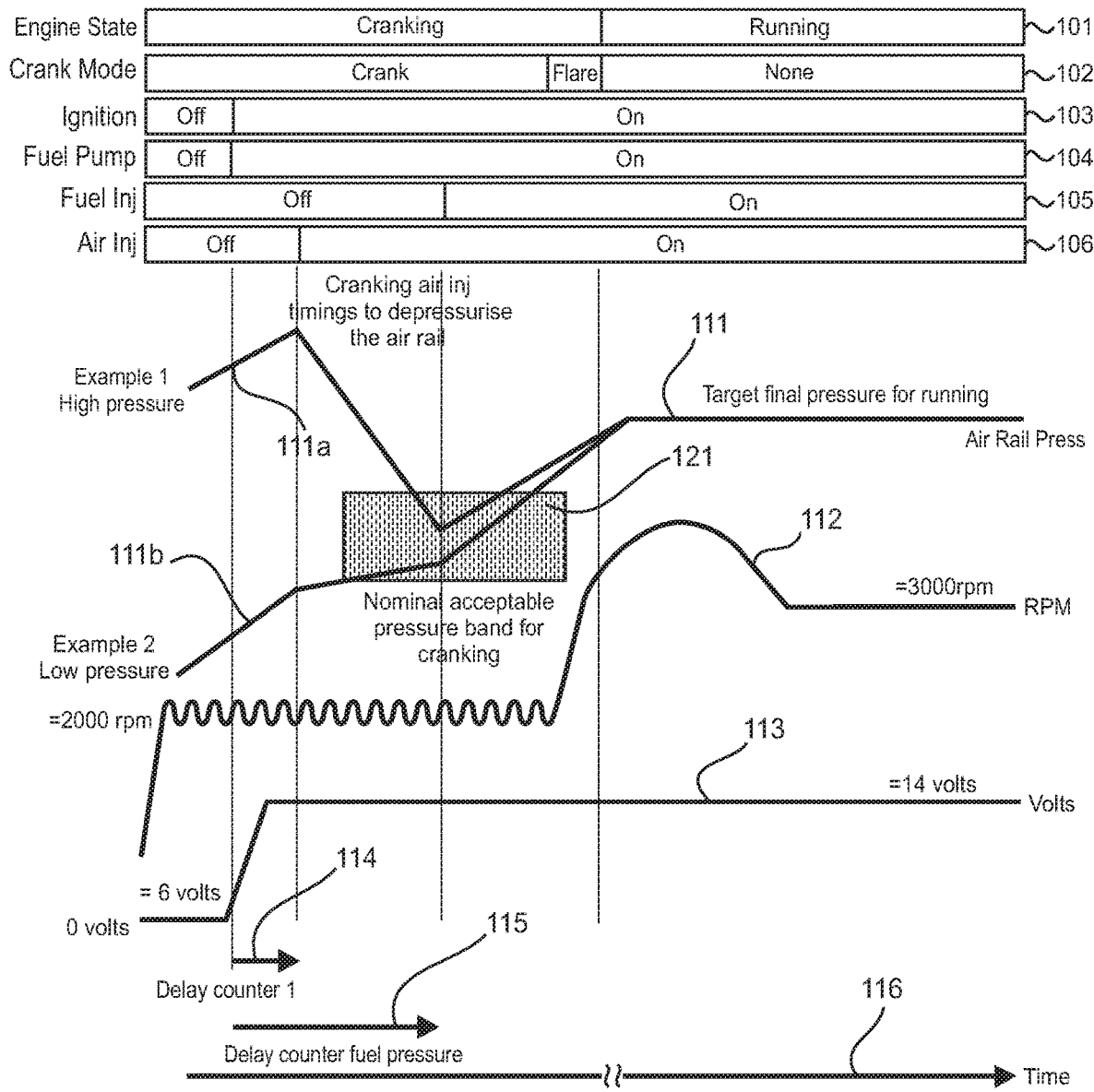
FIG. 4 provides a graphical representation of certain conditions and events occurring during engine start-up under an engine control strategy according to a second embodiment.

In FIG. 4, there is shown schematically a control strategy according to a second embodiment. The horizontal bar chart and graphs depicted in FIG. 4 are similar to those depicted in FIG. 3 and so have corresponding reference numerals. The control strategy depicted in FIG. 4 similarly involves periods of successive opening events of the fluid delivery device 72 (i.e. during the period in which it is active) to allow air to pass into the combustion chamber 26 during the start-up phase of engine 12. These opening events initially allow pressurised air in the gas supply system 90 to pass (i.e. be "dumped") into the combustion chamber 26 to relieve pressure in the gas supply system 90 and thereby provide pressure regulation. Unlike the embodiment depicted in FIG. 3, the active period for the fluid delivery device 72 is not punctuated by an inactive period, but rather is controlled to facilitate the subsequent raising of air pressure in the gas supply system 90 to a desired level. Upon subsequent actuation of the fuel metering device 70, the pressurised air within the gas supply system 90 is at a desired level such that metered quantities of fuel can be entrained in the air and delivered into the combustion chamber 26 to initiate firing of the engine (flare). This completes the start-up phase of the engine 12, and thereafter the fuel metering device 70 and the fluid delivery device 72 operate as normal under the control of the ECU 14 during normal running of the engine.

Figure 5:
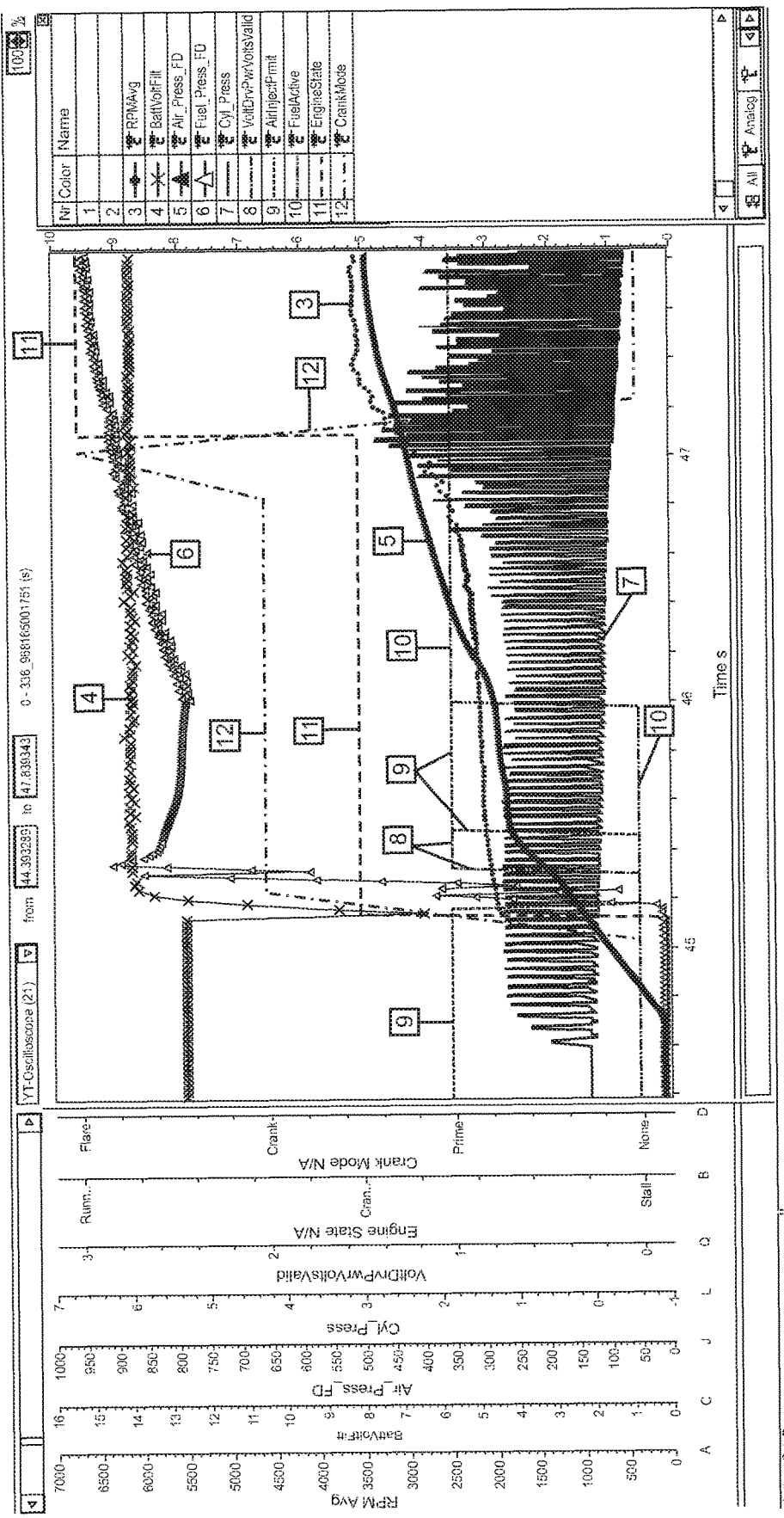
FIG. 5 is a graphical representation of ECU data corresponding to the engine control strategy according to the second embodiment depicted in FIG. 4.

FIG. 5 is a graphical representation of data from ECU 14 corresponding to the engine control strategy according to the second embodiment as depicted in FIG. 4. The data was extracted as a log file using proprietary INCA software (as would be known to a person skilled in the art).

In the control strategy according to this second embodiment, the pressure in the gas supply system 90 is reduced to a level at which it is known that fuel injection can commence reliably. Further, in the arrangement shown, delay counter 2 is disabled, allowing the engine to fire (flare) earlier.

The control strategy according to this second embodiment is particularly suitable in circumstances where air pressure is not required to be very low in order to enable the reliable metering of fuel by the fuel metering device 70 for subsequent entrainment in the air and delivery to the combustion chamber 26 by the fluid delivery device 72. Hence, a less aggressive approach is taken to reducing the air pressure in the gas supply system 90 than that described with reference to Example 1 in FIG. 3.

If, however, there is a need for relatively low air pressure (due to, for example, issues with priming the electrical fuel pump 54), then delay counter 2 may be invoked, thereby providing a period where the compressor 94 can raise the air pressure back up again from zero without any combustion events occurring (i.e. the control strategy waits until the air pressure reaches a minimum pressure before attempting to fire the engine 12 by scheduling some fuel metering and air-fuel delivery events).

It may be noted from bars 102 and 105 in FIG. 4 that the engine does not fire (flare) immediately upon fuel metering commencing when the fuel metering device 70 is first actuated. This, however, is not intended and is considered likely to be a consequence of fluid dynamics in the fuel system.

In the two preceding embodiments, the control strategy selectively opens the fluid delivery device 72 to allow pressurised air in the gas supply system 90 to pass into the combustion chamber 26 to relieve pressure in the gas supply system 90. In other words, a quantity of pressurised air in the gas supply system 90 is selectively "dumped" into the combustion chamber 26, as previously discussed.

In other embodiments, regulating gas pressure in the gas supply system 90 may also comprise opening the fluid delivery device 72 to selectively allow pressurised gas to flow from the combustion chamber to the gas supply system so as to pressurise the gas supply system. In other words, a quantity of pressurised gas in the combustion chamber 26 is selectively "pumped" into the gas supply system 90, as previously discussed. Control strategies according to such embodiments provide arrangements which can provide more options to control air pressure during cranking. In particular, the "pump-down" strategy enables better scheduling for both "pump-downs" and "pump-ups" in a desired sequence. This is a feature of a control strategy according to a third embodiment.

Figure 6:
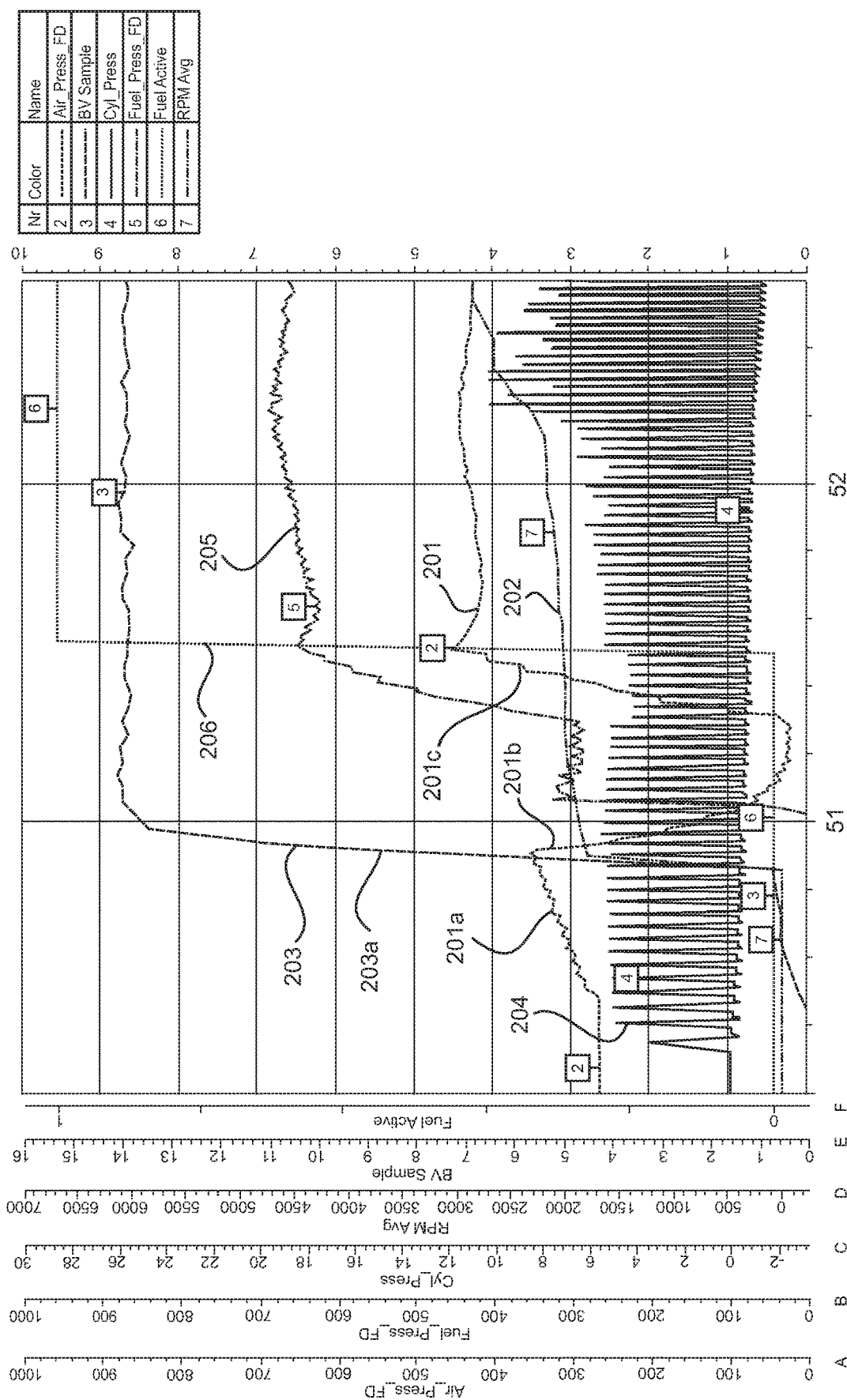
FIG. 6 provides a graphical representation of certain conditions and events occurring during engine start-up under an engine control strategy according to a third embodiment.

Referring now to FIG. 6 there is depicted a graphical representation of certain conditions and events occurring during engine start-up under the engine control strategy according to the third embodiment of the present invention. FIG. 6 includes several graphs relating various operating parameters of the engine 12 with respect to time in the start-up phase. Specifically, the graphs comprise:
  a) plot line 201 relating to air pressure in the gas supply system 90;
  b) plot line 202 relating to the average rotational speed of the crankshaft 28;
  c) plot line 203 relating to voltage delivered by the generator operably coupled to the engine 12;
  d) plot line 204 relating to cylinder pressure (i.e. pressure within the combustion chamber 26);
  e) plot line 205 relating to the fuel pressure delivered by the electrical fuel pump 54; and
  f) plot line 206 relating to the state of the fuel metering device 70 (active or inactive).

As depicted by plot line 201 in FIG. 6, there is some degree of residual air pressure prior to cranking (which is approximately 270 kPa in this example), and this pressure starts to rise when cranking commences. The rising air pressure is indicated by section 201a of plot 201.

The cranking action is reflected by the successive spikes in cylinder pressure (plot line 204).

Voltage delivered by the generator (plot line 203) rises as depicted, which ultimately enables power for the ECU and other components (including the electrical fuel pump 54). At this time, several air injector (i.e. fuel delivery device 72) events (i.e. pump-downs) are scheduled at a crank angle period which enables a reduction in air pressure; that is, the fluid delivery device 72 is rendered active and air is dumped into the engine cylinder (i.e. combustion chamber 26), reducing the air pressure in the gas supply system 90. In this embodiment, the air pressure in the gas supply system 90 is reduced to a level very close to zero. The reducing air pressure is indicated by section 201b of plot 201.

Immediately following that sequence, some other air injector events are scheduled to generate air pressure via capturing cylinder pressure (i.e. "pump-ups"); that is, the fluid delivery device 72 is rendered active and pressurised gas in the combustion chamber 26 is pumped into the gas supply system 90. The increasing air pressure in the gas supply system 90 is indicated by section 201c of plot 201.

At the end of this sequence, the air pressure has achieved the nominal target range (which in this example is about 400 kPa) and normal operational air/delivery events are scheduled in sequence with the fuel events. At this stage, there is a consistent differential between the fuel pressure at fuel metering device 70 within the fuel supply system 50 and the pressure of air in the gas supply system 90 at the time of the dual-fluid delivery.

It is notable that there is a lag period between commencement of engine cranking and the electrical fuel pump 54 being rendered fully operational to deliver fuel at a requisite fuel pressure to the fluid delivery device 72. During this lag period, the sequence of "pump-down" and "pump-up" events (indicated by sections 201b and 201c of plot 201) have effectively delayed the increase in air pressure within the gas supply system 90. This delay compensates for the lagging fuel pressure (which rises more slowly than air pressure), as will be discussed further below. This delay allows the fuel pressure to catch-up to and overtake the gas pressure, and attain a target differential pressure to ensure subsequent consistent fuel delivery by the fluid delivery device 72.

Soon after the voltage rises (indicated by section 203a of plot 203), the electrical fuel pump 54 is powered and generates fuel pressure (plot line 205). In the case depicted, the fuel pressure rises at a time in the process when air pressure is low, thereby providing an opportunity for the electrical fuel pump 54 to purge air from the fuel system. As air pressure in the gas supply system 90 (plot 201) starts to rise, the fuel pressure (plot 205) starts to 'track' the air pressure as expected, ultimately achieving the requisite fuel pressure and maintaining that pressure via fuel regulator 59.

The cylinder pressure plot 204 provides an indication of how this all relates to actual engine events; more specifically, one cylinder pressure cycle per 360 deg, which means one pump-down or one pump-up and one compressor cycle too.

In the embodiments described, the air compressor 94 operates immediately upon cranking of the engine, and as such the gas supply system 90 commences to be pressurised before electrical energy is available for energising the electrical fuel pump 54. As the engine system 10 does not have an air regulator, the sole form of regulation is provided by the fluid delivery device 72, as discussed above. By way of the "pump-down" strategy, gas pressure in the gas supply system 90 can be reduced, and then increased, all during the start-up phase of the engine and all by way of the same fluid delivery device 72. This interrupts the increase in gas pressure in the gas supply system 90, allowing the fuel pressure to catch-up to and overtake the gas pressure, attaining a target differential pressure to ensure consistent fuel delivery by the fluid delivery device 72.

In effect, the "pump-down" strategy serves to prevent over-pressurisation of the gas supply system 90.

The control strategy disclosed herein with reference to the preceding embodiments may also involve opening the fluid delivery device 72 when engine shut-down is imminent to facilitate the discharge of pressurised air from the gas supply system 90 (i.e. with fuel no longer being metered by the fuel metering device 70) in preparation for the next start-up of the engine (thereby ensuring that the air pressure is not relatively high for that next start-up).

The embodiments have been described in relation to engine 12 comprising a single-cylinder. The embodiments would, of course, be applicable to a multi-cylinder engine. In the case of a multi-cylinder engine, the gas supply system 90 may feature a fuel and gas rail as would be understood by a person skilled in the art. In such an arrangement there would typically be a plurality of fluid delivery devices 72, at least one associated with each cylinder. One or more than one of the fluid delivery devices 72 may be opened to effect gas pressure regulation. Where more than one of the fluid delivery devices 72 may be opened to effect gas pressure regulation, they may be opened at the same time or at different times. Further, at least one of the fluid delivery devices 72 may optionally be dedicated to performing a "pump-down" strategy and at least one of the fluid delivery devices may optionally be dedicated to performing a "pump-up" strategy.

In the case of an engine having a fuel and gas rail, the control strategy may also involve opening one or more of the fluid delivery devices 72 associated with the fuel and gas rail when engine shut-down is imminent to discharge pressurised air from the air portion of the fuel and gas rail in preparation for the next start-up.

The various control strategies described above are particularly suited to engine systems which have a fuel injection system including a fluid delivery means operable to deliver a fuel entrained in gas directly into a combustion chamber and in which gas pressure may be generated by the engine system before electrical energy is generated for powering engine elements (such as an electrical fuel pump). For this reason, the various control strategies described above are particularly suitable for use with such an engine system for a UAV, which relies upon application of external torque to effect engine cranking for start-up.

The foregoing disclosure is intended to explain how to fashion and use the particular embodiments described, rather than to limit the true, intended, and fair scope and spirit of the invention. The foregoing description is not intended to be exhaustive, nor to be limited to the precise forms disclosed.

Further, it should be appreciated that various modifications can be made without departing from the principles of the invention. Therefore, the invention should be understood to include all such modifications within its scope. For example, whilst primarily described in terms of its application to engine start-up, the method according to the present invention could equally be applied during normal engine running to manage any air-fuel pressure differential issues which may arise. This broader application to normal engine running may have particular attraction where additional fuel and air pressure sensors may be employed in the fuel system 50 and gas supply system 90.

The terminology used herein is for the purpose of describing particular example embodiments only and is not intended to be limiting.

As used herein, the singular forms "a", "an" and "the" may be intended to include the plural forms as well, unless the context clearly indicates otherwise.

The method steps, processes, and operations described herein are not to be construed as necessarily requiring their performance in the particular order discussed or illustrated, unless specifically identified as an order of performance. It is also to be understood that additional or alternative steps may be employed.

Reference to any positional descriptions, such as "top", "bottom" and "side", are to be taken in context of the embodiments described (and depicted in the drawings in the case of the first embodiment), and are not to be taken as limiting the invention to the literal interpretation of the term but rather as would be understood by the skilled addressee.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Additionally, where the terms "system", "device", and "apparatus" are used in the context of the invention, they are to be understood as including reference to any group of functionally related or interacting, interrelated, interdependent or associated components or elements that may be located in proximity to, separate from, integrated with, or discrete from, each other.

Throughout this specification, unless the context requires otherwise, the word "comprise" or variations such as "comprises" or "comprising", will be understood to imply the inclusion of a stated integer or group of integers but not the exclusion of any other integer or group of integers.

The invention claimed is:

1. A method of operating an internal combustion engine system having a fuel injection system including a fluid delivery means operable to deliver a fuel entrained in gas directly into a combustion chamber and a gas supply system for supplying pressurised gas to the fluid delivery means without a gas pressure regulator, the method comprising supplying pressurised gas to the fluid delivery means from the gas supply system, wherein the pressurised gas is generated initially in response to cranking of the engine, and regulating gas pressure in the gas supply system by interrupting an initial increase in gas pressure in response to cranking of the engine prior to delivery of fuel into the combustion chamber, wherein regulating gas pressure in the gas supply system comprises opening the fluid delivery means to selectively allow gas to pass into the combustion chamber to relieve pressure in the gas supply system.

2. The method according to claim 1 wherein regulating gas pressure in the gas supply system further comprises opening the fluid delivery means to selectively allow pressurised gas to flow from the combustion chamber to the gas supply system so as to pressurise the gas supply system prior to delivery of fuel into the combustion chamber, whereby gas pressure in the gas supply system is caused to increase again.

3. The method according to claim 1 wherein regulating gas pressure in the gas supply system further comprises subsequently opening the fluid delivery means to selectively allow pressurised gas to flow from the combustion chamber to the gas supply system so as to pressurise the gas supply system, whereby during a period between commencement of engine cranking and delivery of fuel into the combustion chamber gas pressure in the gas supply system is initially relieved and then caused to rise.

4. The method according to claim 1 wherein opening the fluid delivery means comprises a single opening event.

5. The method according to claim 1 wherein opening the fluid delivery means comprises a plurality of successive opening events.

6. The method according to claim 1 wherein the operation of an internal combustion engine comprises a start-up phase.

7. The method according to claim 1 further comprising supplying a metered quantity of fuel to the fluid delivery means for delivery into the combustion chamber entrained in gas following regulation of gas pressure in the gas supply system.

8. The method according to claim 1 further comprising cranking of the engine to initiate the start-up phase.

9. The method according to claim 1 wherein pressurized gas is generated by a compressor operably coupled to the engine.

10. The method according to claim 1 wherein the pressurized gas comprises air.

11. The method according to claim 1 further comprising energizing an electrical fuel pump to deliver fuel to the fluid delivery means, the electrical pump being energized using electrical energy generated initially in response to cranking of the engine.

12. The method according to claim 1 wherein there is a lag period between commencement of engine cranking and the delivery of fuel pressure to the fluid delivery means, and wherein the gas pressure in the gas supply system is regulated during the lag period.

13. The method according to claim 12 wherein gas pressure in the gas supply system is reduced considerably to ensure that fuel can be subsequently consistently metered at a target differential pressure.

14. The method according to claim 13 wherein gas pressure is caused to rise again without any combustion events occurring, until the gas pressure reaches a minimum pressure before a combustion event is attempted.

15. The method according to claim 1, wherein the method is used as a control strategy employed during engine start-up.

16. A method of operating an internal combustion engine system having a fuel injection system including a fluid delivery means operable to deliver a fuel entrained in gas directly into a combustion chamber and a gas supply system for supplying pressurised gas to the fluid delivery means without a gas pressure regulator, the method comprising: cranking the engine to initiate a start-up phase; generating compressed gas in the gas supply system for delivery of gas to the fluid delivery means, the compressed gas being generated in response to cranking the engine; generating a supply of electrical energy in response to cranking of the engine; energising an electrical fuel pump for delivery of fuel to the fluid delivery means, the electrical fuel pump being energised using electrical energy generated in response to cranking of the engine, wherein there is a lag period between commencement of engine cranking and the delivery of fuel at a requisite fuel pressure to the fluid delivery means; and regulating gas pressure in the gas supply system during the lag period by interrupting an initial increase in gas pressure in response to cranking of the engine prior to delivery of fuel into the combustion chamber, wherein regulating gas pressure in the gas supply system comprises opening the fluid delivery means to selectively allow gas to pass into the combustion chamber to relieve pressure in the gas supply system.

17. The method according to claim 16 wherein regulating gas pressure in the gas supply system further comprises subsequently opening the fluid delivery means to selectively allow pressurised gas to flow from the combustion chamber to the gas supply system so as to pressurise the gas supply system.

18. The method of claim 17 wherein the gas supply system of the engine is pressurised by opening the fluid delivery means to selectively allow pressurised gas to flow from the combustion chamber to the gas supply system after pressure in the gas supply system has previously been relieved, whereby gas pressure in the gas supply system is caused to increase after having been relieved.

19. The method according to claim 1, wherein the method is used as a control strategy when engine shut-down is imminent.

20. The method according to claim 19 further comprising opening the fluid delivery means when engine shut-down is imminent to discharge pressurised air from the gas supply system.

21. An internal combustion engine system operated in accordance with a method according to claim 1.

22. A vehicle powered by an internal combustion engine system according to claim 21.

23. The vehicle according to claim 22 comprising an unmanned aerial vehicle.

24. An engine management system operable to perform a method according to claim 1.

* * * * *